(12) United States Patent
Kwak et al.

(10) Patent No.: US 7,440,040 B2
(45) Date of Patent: Oct. 21, 2008

(54) LIQUID CRYSTAL DISPLAY DEVICE WITH STORAGE ELECTRODE EXTENSION

(75) Inventors: Sang-Ki Kwak, Cheonan-si (KR); Jung-Joon Park, Suwon-si (KR); Bum-Ki Baek, Suwon-si (KR); Kyung-Phil Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 264 days.

(21) Appl. No.: 11/460,380

(22) Filed: Jul. 27, 2006

(65) Prior Publication Data
US 2007/0030407 A1 Feb. 8, 2007

(30) Foreign Application Priority Data
Aug. 2, 2005 (KR) .................. 10-2005-0070695

(51) Int. Cl.
*G02F 1/1343* (2006.01)
(52) U.S. Cl. .................. 349/39; 349/144; 349/129; 349/38
(58) Field of Classification Search .................. None
See application file for complete search history.

(56) References Cited

U.S. PATENT DOCUMENTS 6,040,882 A * 3/2000 Jun et al. ................. 349/39
7,206,048 B2 * 4/2007 Song ....................... 349/129

* cited by examiner

*Primary Examiner*—Richard H Kim
(74) *Attorney, Agent, or Firm*—H.C. Park & Associates, PLC

(57) ABSTRACT

A liquid crystal display (LCD) includes a gate line, a data line, and a pixel electrode including first and second sub-pixel electrodes to which different voltages are applied. A thin film transistor is coupled with the gate line and the data line to apply a voltage to the pixel electrode, and a storage electrode partially overlaps with the first and second sub-pixel electrodes. The first sub-pixel electrode is arranged on all but one side of the second sub-pixel electrode, portions of a first side of the storage electrode overlap with the boundaries of the first and second sub-pixel electrodes, portions of a second side of the storage electrode protrude and partially overlap with the second sub-pixel electrode, and the storage electrode comprises a storage electrode extension, which protrudes from the second side of the storage electrode across the first sub-pixel electrode and overlaps with the second sub-pixel electrode.

7 Claims, 8 Drawing Sheets

LIQUID CRYSTAL DISPLAY DEVICE WITH STORAGE ELECTRODE EXTENSION

This application claims priority from and the benefit of Korean Patent Application No. 10-2005-0070695, filed on Aug. 2, 2005, which is hereby incorporated by reference for all purposes as if fully set forth herein.

BACKGROUND OF THE INVENTION

1. Field of the Invention

The present invention relates to a liquid crystal display (LCD), and more particularly, to a vertical alignment LCD.

2. Discussion of the Background

Liquid crystal displays (LCD) are one of the most widely used flat panel displays. Generally, an LCD includes two substrates provided with field-generating electrodes, such as pixel electrodes and a common electrode, and a liquid crystal (LC) layer interposed therebetween. The LCD displays images by applying voltages to the field-generating electrodes to generate an electric field in the LC layer, which determines orientations of the layer's LC molecules to adjust polarization of incident light.

Among LCDs, a vertical alignment (VA) mode LCD, which aligns LC molecules such that the long axes of the LC molecules are perpendicular to the substrates in absence of electric field, is popular because of its high contrast ratio and wide reference viewing angle, which may be defined as a viewing angle making the contrast ratio equal to 1:10 or as a limit angle for the inversion in luminance between the grays.

Additionally, a domain-division type LCD has been developed in which domains are divided into multiple groups, and different data voltages are applied to the respective domain groups. In particular, one pixel may be divided into at least two domain groups by coupling of a connecting electrode so that different data voltages may be applied to the respective domain groups.

In such conventional LCDs, a pixel electrode may be formed to slightly overlap with storage electrode wiring, to which a common voltage is applied, in order to uniformly maintain the level of voltage applied to the pixel electrode. However, if an overlay error occurs when forming the pixel electrode over the storage electrode wiring, the overlap area of the pixel electrode and storage electrode wiring may undesirably differ from one domain to another. In this case, the voltage ratio between a pair of adjacent domains may be irregular, and thus, black and white stripes may be formed on the LCD's screen.

SUMMARY OF THE INVENTION

The present invention provides an LCD that may have superior display characteristics even when an overlay error occurs when forming a pixel electrode over storage electrode wiring.

Additional features of the invention will be set forth in the description which follows, and in part will be apparent from the description, or may be learned by practice of the invention.

The present invention discloses a liquid crystal display including a gate line arranged on an insulating substrate, a data line insulated from the gate line and crossing with the gate line, a pixel electrode having first and second sub-pixel electrodes to which different voltages are applied, a thin film transistor that is electrically connected with the gate line and the data line to apply a voltage to the pixel electrode, and a storage electrode that overlaps with the first and second sub-pixel electrodes. The first sub-pixel electrode is arranged on all but one side of the second sub-pixel electrode, portions of a first side of the storage electrode overlap with boundaries of the first and second sub-pixel electrodes, portions of a second side of the storage electrode overlap with a boundary of the first sub-pixel electrode, and the storage electrode includes a storage electrode extension that protrudes from the second side of the storage electrode across the first sub-pixel electrode and overlaps with the second sub-pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
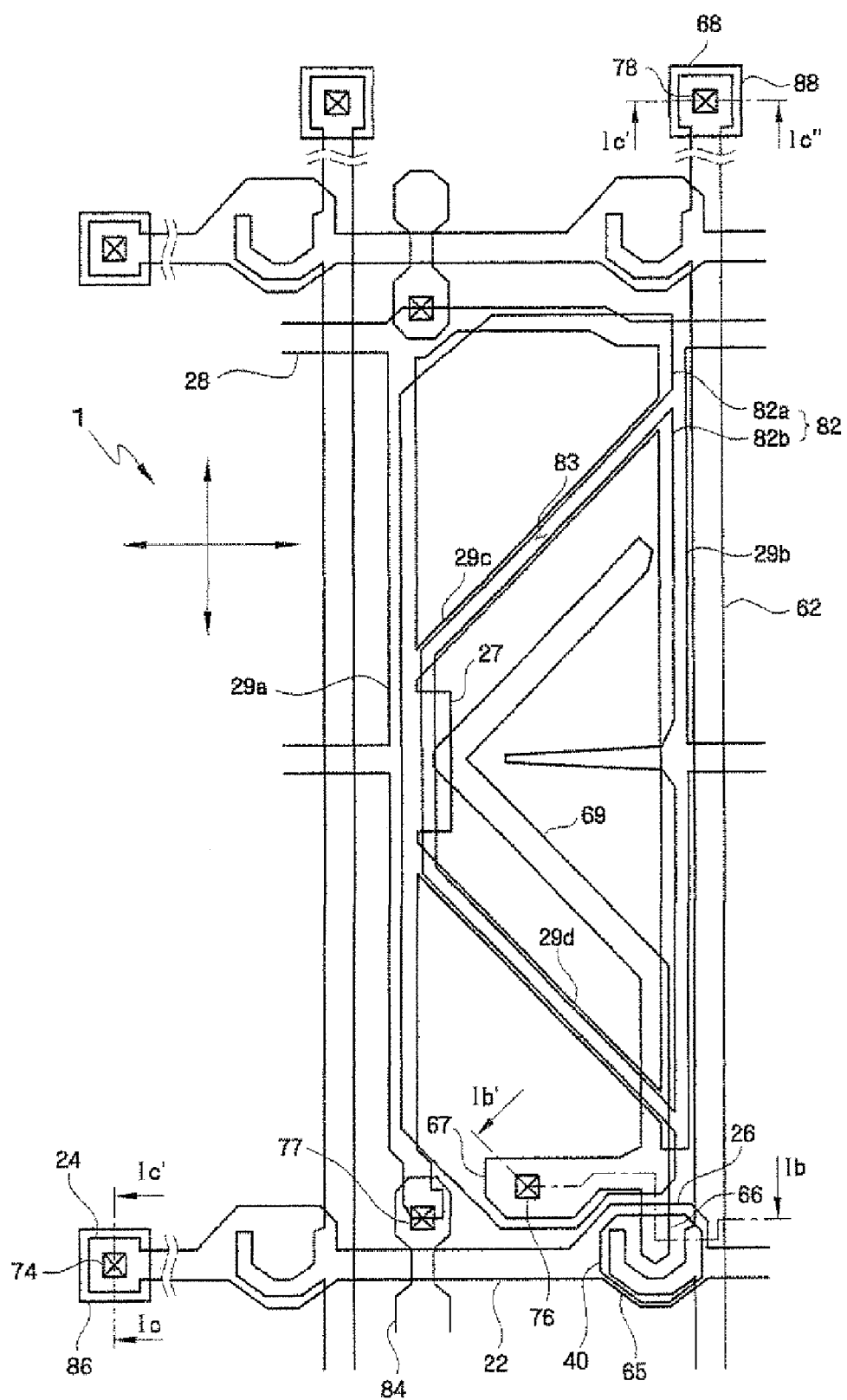
FIG. 1A is a layout of a thin film transistor (TFT) substrate of an LCD according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an exemplary embodiment of the present invention will now be described more fully with reference to the accompanying drawings.

The LCD includes a TFT substrate, which comprises a TFT and pixels defined by a gate line and a data line, and a common electrode substrate, which faces the TFT substrate and includes a color filter. A liquid crystal layer is interposed between the TFT substrate and the common electrode substrate. The liquid crystal layer includes liquid crystal molecules that are aligned with their long axes substantially perpendicular to the TFT substrate and the common electrode substrate.

First, the TFT substrate will now be described in further detail with reference to FIG. 1A, FIG. 1B, and FIG. 1C.

Figure 1B:
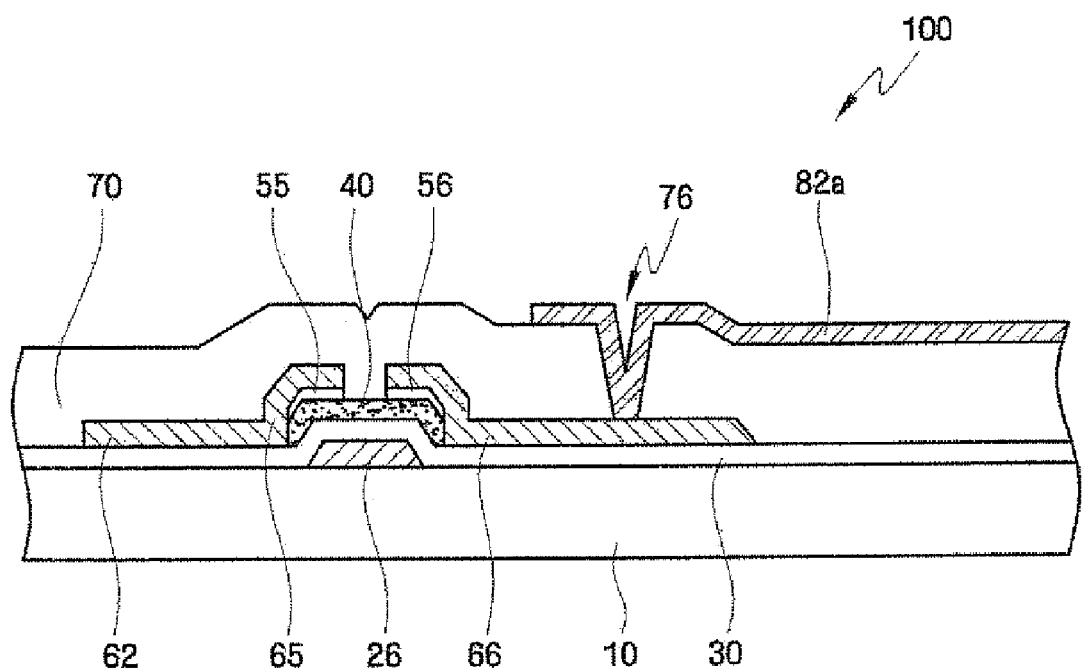
FIG. 1B is a cross-sectional view taken along line Ib-Ib' of FIG. 1A.
Figure 1C:
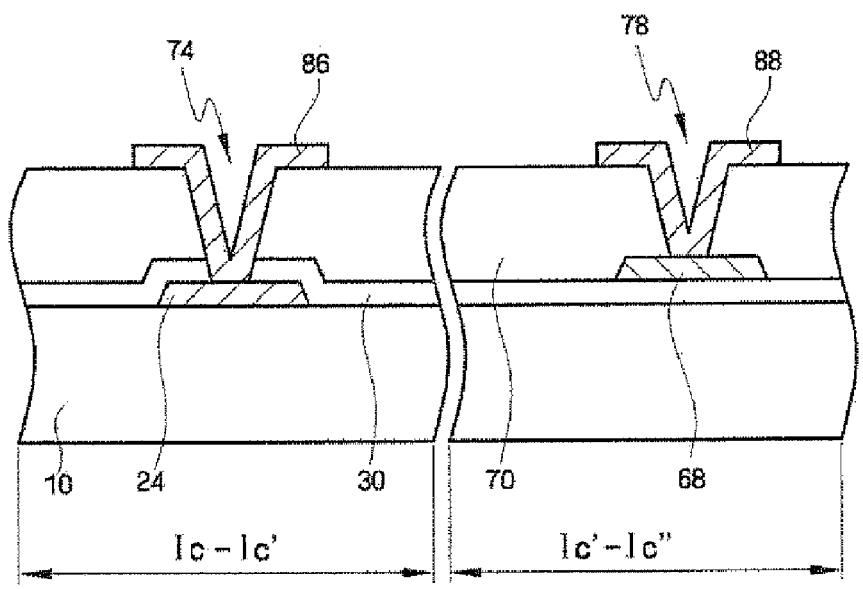
FIG. 1C is a cross-sectional view taken along lines Ic-Ic' and Ic'-Ic" of FIG. 1A.

FIG. 1A is a layout of a TFT substrate of an LCD according to an exemplary embodiment of the present invention, FIG. 1B is a cross-sectional view taken along line Ib-Ib' of FIG. 1A, and FIG. 1C is a cross-sectional view taken along lines Ic-Ic' and Ic'-Ic" of FIG. 1A.

Referring to FIG. 1A, FIG. 1B, and FIG. 1C, a gate line 22 is formed on an insulating substrate 10 along a horizontal direction, and a gate electrode 26 is formed protruding from the gate line 22. A gate line end portion 24, which receives gate signals from another layer or external circuit, is formed at an end of the gate line 22. The gate line end portion 24 is wider than the gate line 22 in order to effectively couple the gate line 22 with an external circuit. The gate line 22, the gate electrode 26, and the gate line end portion 24 constitute gate wiring.

Additionally, a storage electrode line 28 is formed on the insulating substrate 10 along the horizontal direction and is substantially parallel to the gate line 22. A plurality of storage electrodes 29a, 29b, 29c, and 29d are formed as branches of the storage electrode line 28 along edges of first and second sub-pixel electrodes 82a and 82b. For example, the storage electrodes include: storage electrode vertical patterns 29a and 29b, which extend from the storage electrode line 28 along a data line 62 and overlap with the first and second sub-pixel electrodes 82a and 82b, and storage electrode oblique patterns 29c and 29d, which are formed along corresponding gaps 83 between the first and second sub-pixel electrodes 82a and 82b. The storage electrode oblique patterns 29c and 29d connect the storage electrode vertical patterns 29a and 29b. The storage electrode vertical patterns 29a and 29b may overlap with the first and second sub-pixel electrodes 82a and 82b by using a storage electrode extension 27, which extends from the storage electrode vertical pattern 29a. The storage electrode line 28, the storage electrodes 29a, 29b, 29c, 29d, and the storage electrode extension 27 constitute storage electrode wiring.

In the present embodiment, in order to increase the LCD's aperture ratio, the storage electrode wiring 27, 28, 29a, 29b, 29c, and 29d is arranged along the sides of the first and second sub-pixel electrodes 82a and 82b. However, the storage electrode wiring 27, 28, 29a, 29b, 29c, and 29d may have various shapes and arrangements as long as predetermined storage capacitance formation conditions are met in association with the first and second sub-pixel electrodes 82a and 82b.

The gate wiring 22, 24, and 26 and the storage electrode wiring 27, 28, 29a, 29b, 29c, and 29d may be made of Al, an Al alloy, Ag, an Ag alloy, Cu, a Cu alloy, Mo, an Mo alloy, Cr, Ti or Ta. Additionally, the gate wiring 22, 24, and 26 and the storage electrode wiring 27, 28, 29a, 29b, 29c, and 29d may have a multi-layered structure including two conductive films (not shown) having different physical characteristics. One of the two films may be made of a low resistivity metal including Al, an Al alloy, Ag, an Ag alloy, Cu, and a Cu alloy for reducing signal delay or voltage drop. The other film may be made of material such as Mo, an Mo alloy, Cr, Ta or Ti, which have good physical, chemical, and electrical contact characteristics with other materials such as indium tin oxide (ITO) or indium zinc oxide (IZO). Examples of the multi-layered structure include a lower Cr film and an upper Al film, and a lower Al film and an upper Mo film. However, the gate wiring 22, 24, and 26 and the storage electrode wiring 27, 28, 29a, 29b, 29c, and 29d may be made of various metals or conductors.

A gate insulation layer 30 is formed on the gate wiring 22, 24, and 26 and the storage electrode wiring 27, 28, 29a, 29b, 29c, and 29d.

A semiconductor layer 40, which may be formed of hydrogenated amorphous silicon or porous silicon, is formed on the gate insulation layer 30. The semiconductor layer 40 may have various shapes such as an island and a line. For example, FIG. 1A shows an island-shaped semiconductor layer 40. When the semiconductor layer 40 is line-shaped, it may be positioned below the data line 62 and extend to the gate electrode 26.

Ohmic contact layers 55 and 56 may be formed of, for example, silicide or n+ hydrogenated silicon doped with a high concentration of n-type impurities, on the semiconductor layer 40. The ohmic contact layers 55 and 56 may have various shapes such as an island and a line. For example, FIG. 1B shows island-shaped ohmic contact layers 55 and 56 positioned below the drain electrode 66 and the source electrode 65. Line-shaped ohmic contact layers may extend over the gate electrode 26.

The data line 62 and the drain electrode 66 are formed on the ohmic contact layers 55 and 56 and the gate insulation layer 30. The data line 62 extends in the longitudinal direction to cross with the gate line 22, thereby defining a pixel. The source electrode 65 branches off from the data line 62 and extends over the semiconductor layer 40. A data line end portion 68, which receives data signals from another layer or from an external circuit and transmits the data signals to the data line 62, is formed at an end of the data line 62. The data line end portion 68 is wider than the data line 62 in order to effectively couple the data line 62 with the external circuit. The drain electrode 66 and the source electrode 65 are separated from each other and are located on opposite sides of the gate electrode 26.

The drain electrode 66 comprises a strip-type pattern, which is formed on the semiconductor layer 40, and a drain electrode extension 67, which extends from the strip-type pattern and is partially exposed by a contact hole 76. A coupling electrode 69, which is formed of the same material and on the same layer as the drain electrode 66, branches off from the drain electrode 66. The coupling electrode 69 overlaps with the second sub-pixel electrode 82b, thereby forming a coupling capacitance with the second sub-pixel electrode 82b. The coupling electrode 69 may be formed along cutouts (92 of FIG. 2 and FIG. 3A) of a common electrode in order to enhance aperture ratio and prevent texture and light leakage. The data line 62, the data line end portion 68, the source electrode 65, the drain electrode 66, including the drain electrode extension 67, and the coupling electrode 69 constitute data wiring.

The data wiring 62, 65, 66, 67, 68, and 69 may be made of a refractory metal such as Cr, Mo, Ti, Ta or alloys thereof. Also, the data line wiring 62, 65, 66, 67, 68, and 69 may have a multilayered structure including a low-resistivity film (not shown) and a good-contact film (not shown). Examples of the multi-layered structure include a double-layered structure of a lower Cr film and an upper Al film, a double-layered structure of a lower Al film and an upper Mo film, and a triple-layered structure of a lower Mo film, an intermediate Al film, and an upper Mo film.

The source electrode 65 at least partially overlaps with the semiconductor layer 40, and the drain electrode 66 and the source electrode 65 are located on opposite sides of the gate electrode 26 at least partially overlying the semiconductor layer 40. Here, the ohmic contacts 55, 56 are interposed between the semiconductor layer 40 and the source and drain electrodes 65, 66, respectively, to reduce the contact resistance between them.

A passivation layer 70, which acts as an insulation layer, is formed on the data line 62, the drain electrode 66, and the semiconductor layer 40. Here, the passivation (protective) layer 70 may be made of an inorganic insulator such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD). Alternatively, the passivation layer 70 may have a double-layered structure of a lower inorganic film and an upper organic film in order to protect the exposed semiconductor layer 40 while maintaining characteristics as an organic layer.

The contact hole 76 and a contact hole 78 are formed through the passivation layer 70 to expose the drain electrode 66 and the data line end portion 68, respectively. A contact hole 74 is formed through the passivation layer 70 and the gate insulation layer 30 to expose the gate line end portion 24.

A pixel electrode 82 is formed corresponding to the shape of a pixel on the passivation layer 70. The pixel electrode 82 includes the first and second sub-pixel electrodes 82a and 82b, which are separated by gaps 83. The gaps form an angle of about 45 degrees or −45 degrees with a transmission axis 1 of a polarizing plate. The second sub-pixel electrode 82b is formed in a rotated 'V' shape and is located in the middle of a pixel region. The first sub-pixel electrode 82a is formed on portions of the pixel region without the second sub-pixel electrode 82b. Here, a plurality of cutouts (not shown) or protrusions (not shown) may be formed in or on the first and second sub-pixel electrodes 82a and 82b along an oblique direction. A display region of the pixel electrode 82 may be divided into a plurality of domains in consideration of a direction in which directors of liquid crystal molecules align when applying an electric field to the liquid crystal layer. Each domain may be divided into a plurality of sub-domains using the cutouts/protrusions formed in/on the pixel electrode 82.

The first sub-pixel electrode 82a is electrically connected to the drain electrode 66 through the contact hole 76, and the second sub-pixel electrode 82b is coupled, but not directly, to the drain electrode 66 via the coupling electrode 69, which extends from the drain electrode 66.

An auxiliary gate line end portion 86 and an auxiliary data line end portion 88 are formed on the passivation layer 70 and are connected to the gate line end portion 24 and the data line end portion 68 via the contact holes 74 and 78, respectively. Additionally, a contact hole 77 is formed through the passivation layer 70 to expose the storage electrode wiring 27, 28, 29a, 29b, 29c, and 29d. A connection element 84 is formed on the passivation layer 70 and electrically connects the storage electrode wirings 27, 28, 29a, 29b, 29c, and 29d of adjacent pixel regions. Here, the first and second sub-pixel electrodes 82a, 82b and the auxiliary gate and data line end portions 86, 88 may be made of a transparent conductor such as ITO or IZO or a reflective conductor such as Al. The auxiliary gate line end portion 86 and the auxiliary data line end portion 88 electrically connect the gate line end portion 24 and the data line end portion 68, respectively, with an external device.

The first sub-pixel electrode 82a is physically and electrically connected to the drain electrode 66 through the contact hole 76, and the drain electrode 66 applies a data voltage to the first sub-pixel electrode 82a. The second sub-pixel electrode 82b is electrically floated and is capacitively coupled with the first sub-pixel electrode 82a by the coupling electrode 69, which is connected to the drain electrode 66 and overlaps with the second sub-pixel electrode 82b.

In other words, the voltage of the second sub-pixel electrode 82b varies according to the voltage of the first sub-pixel electrode 82a. The absolute value of the voltage of the second sub-pixel electrode 82b may always be smaller than the absolute value of the voltage of the first sub-pixel electrode 82a. Alternatively, the data voltage may be applied to the second sub-pixel electrode 82b, and the first sub-pixel electrode 82a may be capacitively coupled with the second sub-pixel electrode 82b.

When arranged in a pixel in as described above, the first and second sub-pixel electrodes 82a and 82b having different data voltages may be compensated for, thus reducing gamma curve distortion and widening a reference viewing angle.

As described above, even when an overlay error occurs when forming the pixel electrode 82 over the storage electrode wiring 27, 28, 29a, 29b, 29c, and 29d, the overlap area of the pixel electrode 82 and the storage electrode wiring 27, 28, 29a, 29b, 29c, and 29d may still be substantially uniformly maintained in order to substantially uniformly maintain the voltage ratio between a plurality of adjacent domains. For example, the pixel electrode 82 is formed so that both of its sides may be superimposed on the storage electrode vertical patterns 29a and 29b. Thus, even when an overlay error occurs when forming the pixel electrode 82 over the storage electrode wiring 27, 28, 29a, 29b, 29c, and 29d, the overlap area of the pixel electrode 82 and the storage electrode wiring 27, 28, 29a, 29b, 29c, and 29d may be substantially uniformly maintained because the overlap area of the pixel electrode 82 and the storage electrode vertical patterns 29a and 29b may be compensated for. When the second sub-pixel electrode 82b is capacitively coupled with the first sub-pixel electrode 82a by the coupling electrode 69, the second sub-pixel electrode 82b may be formed so that portions of its right side overlap with the storage electrode vertical pattern 29b and portions of its left side overlap with the storage electrode extension 27, which extends from, and is wider than, the storage electrode vertical pattern 29a. Here, the coupling of the first and second sub-pixel electrodes 82a and 82b will be described below in detail with reference to FIG. 4.

An alignment layer (not shown) for aligning a liquid crystal layer may be formed on the pixel electrode 82, the auxiliary gate line end portion 86, the auxiliary data line end portion 88, and the passivation layer 70.

Figure 2:
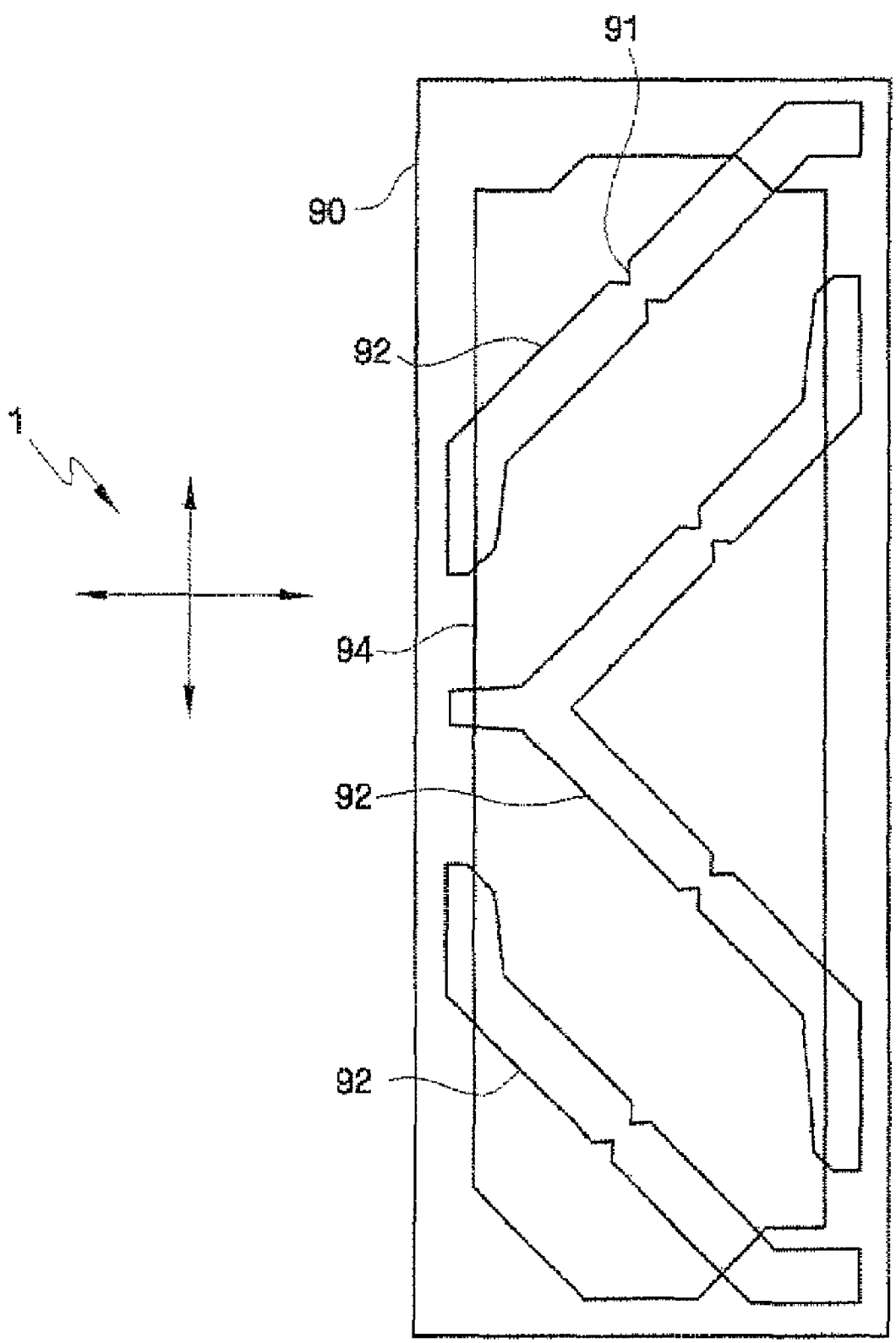
FIG. 2 is a layout of a common electrode substrate of an LCD according to an exemplary embodiment of the present invention.

A common electrode substrate for an LCD according to an exemplary embodiment of the present invention and an LCD having the common electrode substrate will now be described in detail with reference to FIG. 2, FIG. 3A, and FIG. 3B. FIG. 2 is a layout of a common electrode substrate of an LCD according to an exemplary embodiment of the present invention, FIG. 3A is a layout of the TFT substrate of FIG. 1A and the common electrode substrate of FIG. 2, and FIG. 3B is a cross-sectional view taken along line IIIb-IIIb' of FIG. 3A.

Figure 3A:
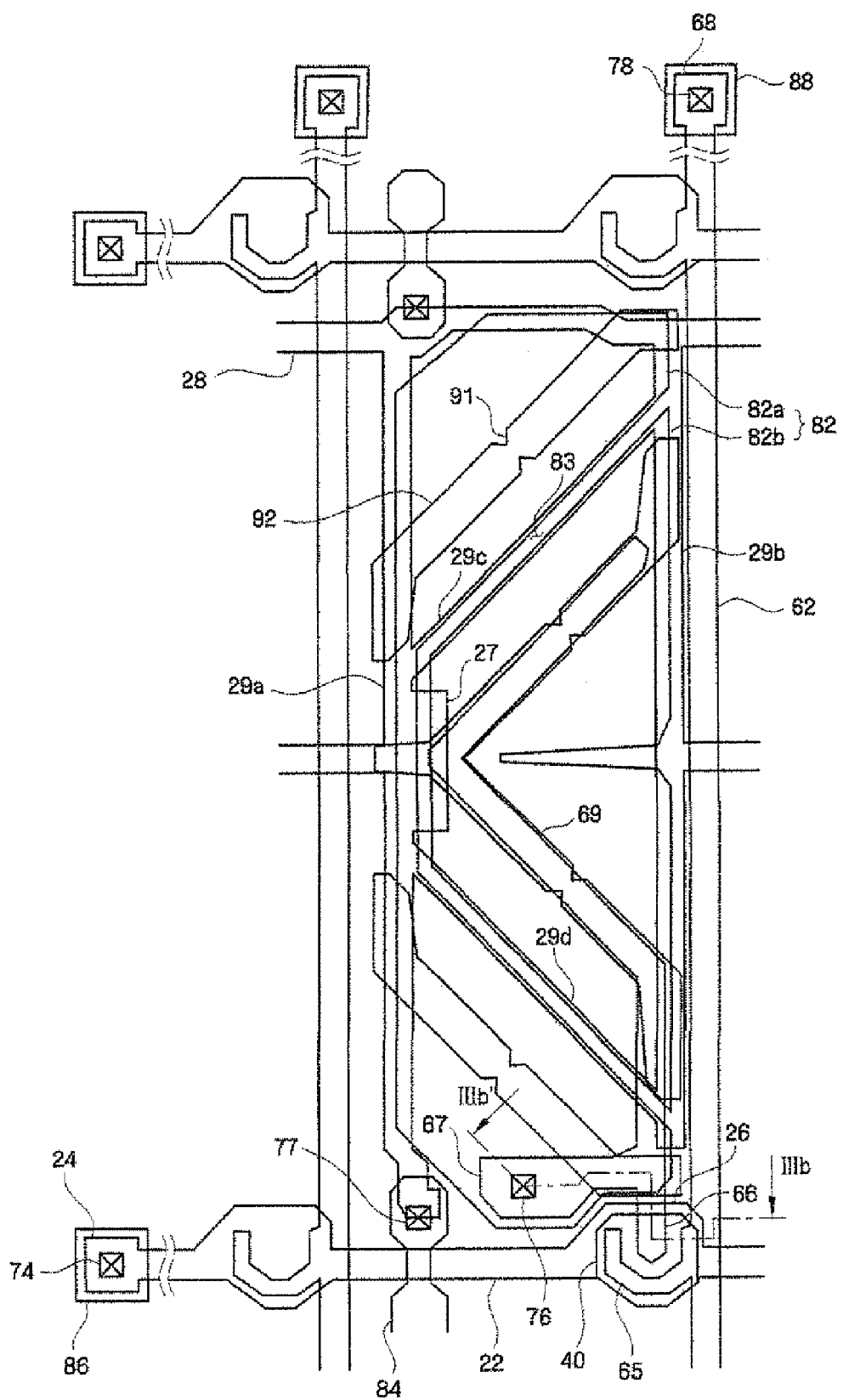
FIG. 3A is a layout including the TFT substrate of FIG. 1A and the common electrode substrate of FIG. 2.
Figure 3B:
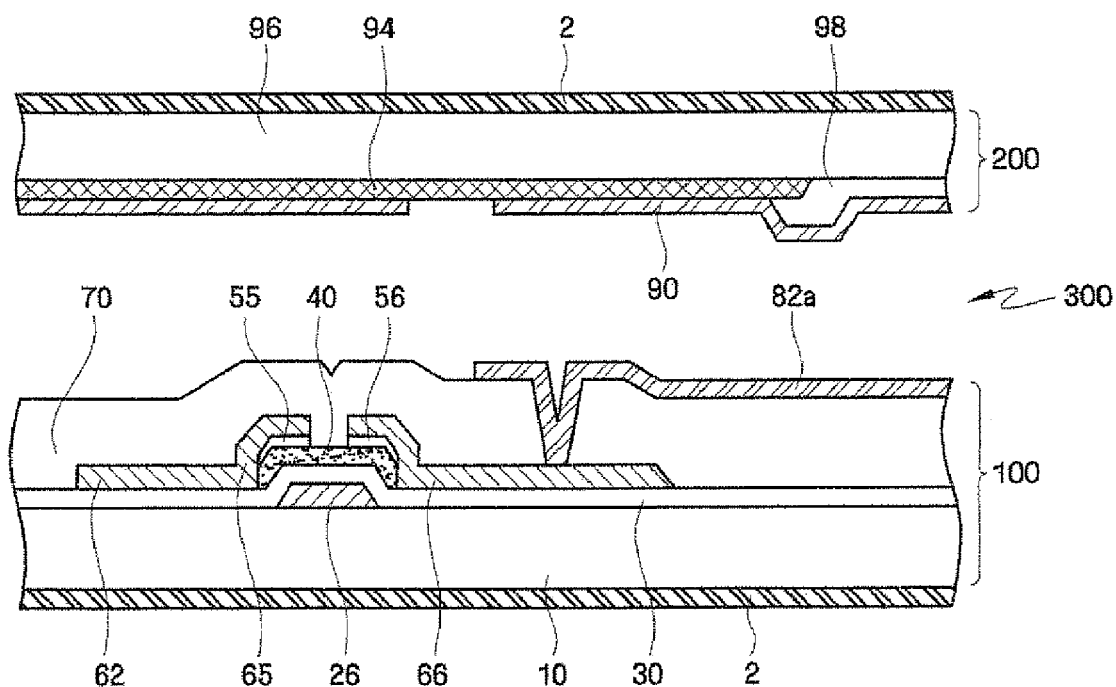
FIG. 3B is a cross-sectional view taken along line IIIb-IIIb' of FIG. 3A.

Referring to FIG. 2, FIG. 3A, and FIG. 3B, a black matrix 94, which prevents light leakage, and color filters 98 (e.g., red, green, and blue filters), which are sequentially arranged in each pixel, are formed on an insulation material 96, which may be a transparent insulation material, such as glass. A common electrode 90 is formed of a transparent conductive material, such as ITO or IZO, on the color filters 98, and it includes oblique cutouts 92. Each oblique cutout 92 has a notch 91 in the middle. The notch 91 may be triangular, rectangular, trapezoidal, or semicircular. Liquid crystal molecules near domain boundaries may be stably and uniformly arranged due to the notch 91, thus preventing dark spots or afterimages from generating near the domain boundaries.

The common electrode 90 faces a pixel electrode 82 and includes the oblique cutouts 92, which form an angle of about 45 degrees or −45 degrees with a transmission axis 1 of a polarizing plate 2. The common electrode 90 may include protrusions (not shown) instead of the oblique cutouts 92. The oblique cutouts 92 and the protrusions may be referred to as domain dividers.

An alignment layer (not shown) for aligning liquid crystal molecules may be formed on the common electrode 90.

Referring to FIG. 3A, an oblique cutout 92 of the common electrode 90 and a gap 83, which separates the first and second sub-pixel electrodes 82a and 82b, may be alternately arranged.

Referring to FIG. 3B, a TFT substrate 100 and a common electrode substrate 200 are vertically aligned with each other and then are coupled with each other with a liquid crystal layer 300 interposed therebetween, thereby forming a basic architecture for an LCD according to an exemplary embodiment of the present invention.

Liquid crystal molecules included in the liquid crystal layer 300 are aligned so that their directors may be perpendicular to the TFT substrate 100 and the common electrode substrate 200 and have negative dielectric anisotropy. The TFT substrate 100 and the common electrode substrate 200 are aligned with each other so that the pixel electrode 82 and the color filters 98 precisely overlap with each other. Then, a pixel may be divided into a plurality of domains by the oblique cutouts 92 and the gaps 83. A pixel may be divided into left and right domains by the gaps 83 and may also be divided into upper and lower domains per the direction in which liquid crystal molecules are aligned. In other words, a pixel may be divided into a plurality of domains according to the direction in which the directors of liquid crystal molecules included in a liquid crystal layer are aligned when an electric field is applied to the liquid crystal layer.

An LCD according to an exemplary embodiment of the present invention may not only include the basic architecture illustrated in FIG. 3B, but may also include other elements, such as a polarizing plate and a backlight assembly.

A polarizing plate 2 may be installed on either side of the basic architecture in such a manner that one transmission axis is parallel to the gate line 22 and another transmission axis is perpendicular to the gate line 22.

In an LCD according to an exemplary embodiment of the present invention, a liquid crystal in each of a plurality of domains of a pixel tilts perpendicularly to the gaps 83 or the oblique cutouts 92 when applying an electric field thereto. Thus, the liquid crystal in each domain forms an angle of about 45 degrees or −45 degrees with a transmission axis of a polarizing plate 2. A lateral electric field formed in each gap 83 or oblique cutout 92 helps align the liquid crystal in each domain.

In this LCD, an image signal voltage may be applied from a TFT to the first sub-pixel electrode 82a, and the second sub-pixel electrode 82b is capacitively coupled with the first sub-pixel electrode 82a. Thus, the voltage of the second sub-pixel electrode 82b varies according to the image signal voltage applied to the first sub-pixel electrode 82a. Furthermore, the absolute value of the voltage of the second sub-pixel electrode 82b will be smaller than the absolute value of the voltage of the first sub-pixel electrode 82a. Accordingly, it is possible to reduce the possibility of gamma curve distortion by arranging the first and second sub-pixel electrodes 82a and 82b in a pixel in such a manner that they may be complementary to each other, as described above.

The coupling of the first and second sub-pixel electrodes 82a and 82b will now be described in detail with reference to FIG. 4, which is a circuit diagram of an LCD according to an exemplary embodiment of the present invention.

Figure 4:
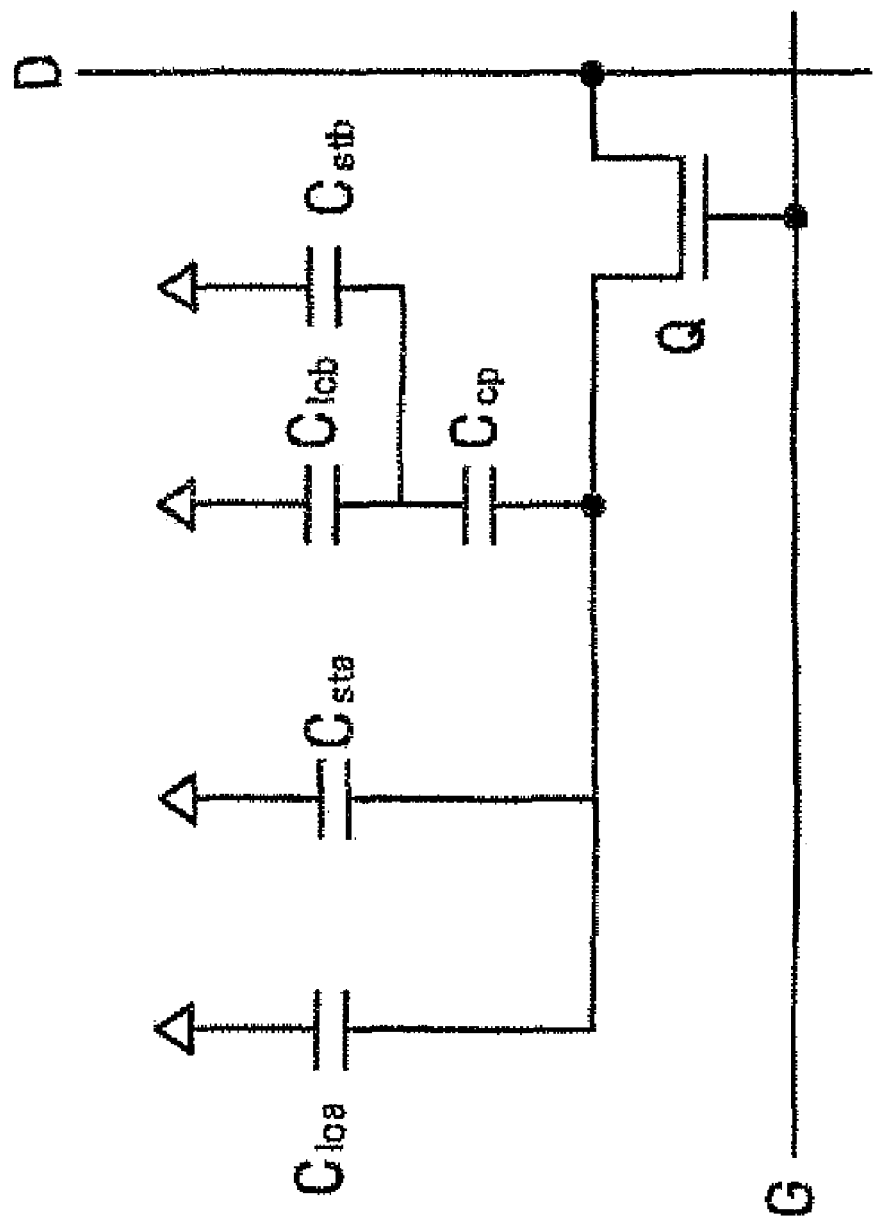
FIG. 4 is a circuit diagram of an LCD according to an exemplary embodiment of the present invention.

Referring to FIG. 3A and FIG. 4, $C_{lca}$ is a liquid crystal capacitor formed between the first sub-pixel electrode 82a and the common electrode 90, $C_{sta}$ is a storage capacitor formed between the first sub-pixel electrode 82a and the storage electrode wiring 27, 28, 29a, 29b, 29c, and 29d, $C_{stb}$ is a storage capacitor formed between the second sub-pixel electrode 82b and the storage electrode wiring 27, 28, 29a, 29b, 29c, and 29d, $C_{lcb}$ is a liquid crystal capacitor formed between the second sub-pixel electrode 82b and the common electrode 90, and $C_{cp}$ is a coupling capacitor formed between the first sub-pixel electrode 82a and the second sub-pixel electrode 82b, particularly between the second sub-pixel electrode 82b and the coupling electrode 69.

Referring to FIG. 4, a TFT Q of a pixel is a tri-end portion device including a control end portion (e.g., the gate electrode 26) electrically connected with a gate line G (e.g., the gate line 22), an input end portion (e.g., the source electrode 65) electrically connected with a data line D (e.g., the data line 62), and an output end portion (e.g., the drain electrode 66) electrically connected with the liquid crystal capacitors $C_{lca}$ and $C_{lcb}$ and to the storage capacitor $C_{st}$.

The voltage across the first and second sub-pixel electrodes 82a, 82b is denoted by Va and Vb, respectively. The voltage distribution law results in:

$$Vb = Va \times [C_{cp}/(C_{cp}+C_{lcb}+C_{stb})].$$

Since $C_{cp}/(C_{cp}+C_{lcb}+C_{stb})$ is always less than one, the voltage Vb will be less than the voltage Va. A proportion of Vb to Va may be adjusted by controlling the capacitance of the capacitor $C_{cp}$, which may be controlled by adjusting the contact area or the distance between the second sub-pixel electrode 82b and the coupling electrode 69. As described above, the coupling electrode 69 may be arranged in various manners.

Here, if an overlay error occurs when forming the pixel electrode 82 over the storage electrode wiring 27, 28, 29a, 29b, 29c, and 29d, the capacitance of the capacitor $C_{stb}$ may vary according to the overlap area of the second sub-pixel electrode 82b and the storage electrode wiring 27, 28, 29a, 29b, 29c, and 29d. Therefore, in order to substantially uniformly maintain the ratio between the voltage Va and the voltage Vb, an LCD including the capacitor $C_{stb}$ should be designed such that the capacitor $C_{stb}$ has a predetermined capacitance regardless of whether an overlay error occurs when forming the pixel electrode 82 over the storage electrode lines 27, 28, 29a, 29b, 29c, and 29d.

As described above, in an LCD according to an exemplary embodiment of the present invention, the second sub-pixel electrode 82b is formed such that portions of its right side overlap with the storage electrode vertical pattern 29b and portions of its left side overlap with the storage electrode extension 27, which extends from the storage electrode vertical pattern 29a. Therefore, it may be possible to substantially uniformly maintain the capacitance of the capacitor $C_{stb}$ even when an overlay error occurs when forming the pixel electrode 82 over the storage electrode wiring 27, 28, 29a, 29b, 29c, and 29d. Consequently, it may be possible to substantially uniformly maintain the ratio between the voltage Va and the voltage Vb, thereby preventing the LCD's display characteristics from deteriorating.

An LCD according to another exemplary embodiment of the present invention will now be described in detail with reference to FIG. 5A and FIG. 5B.

Figure 5A:
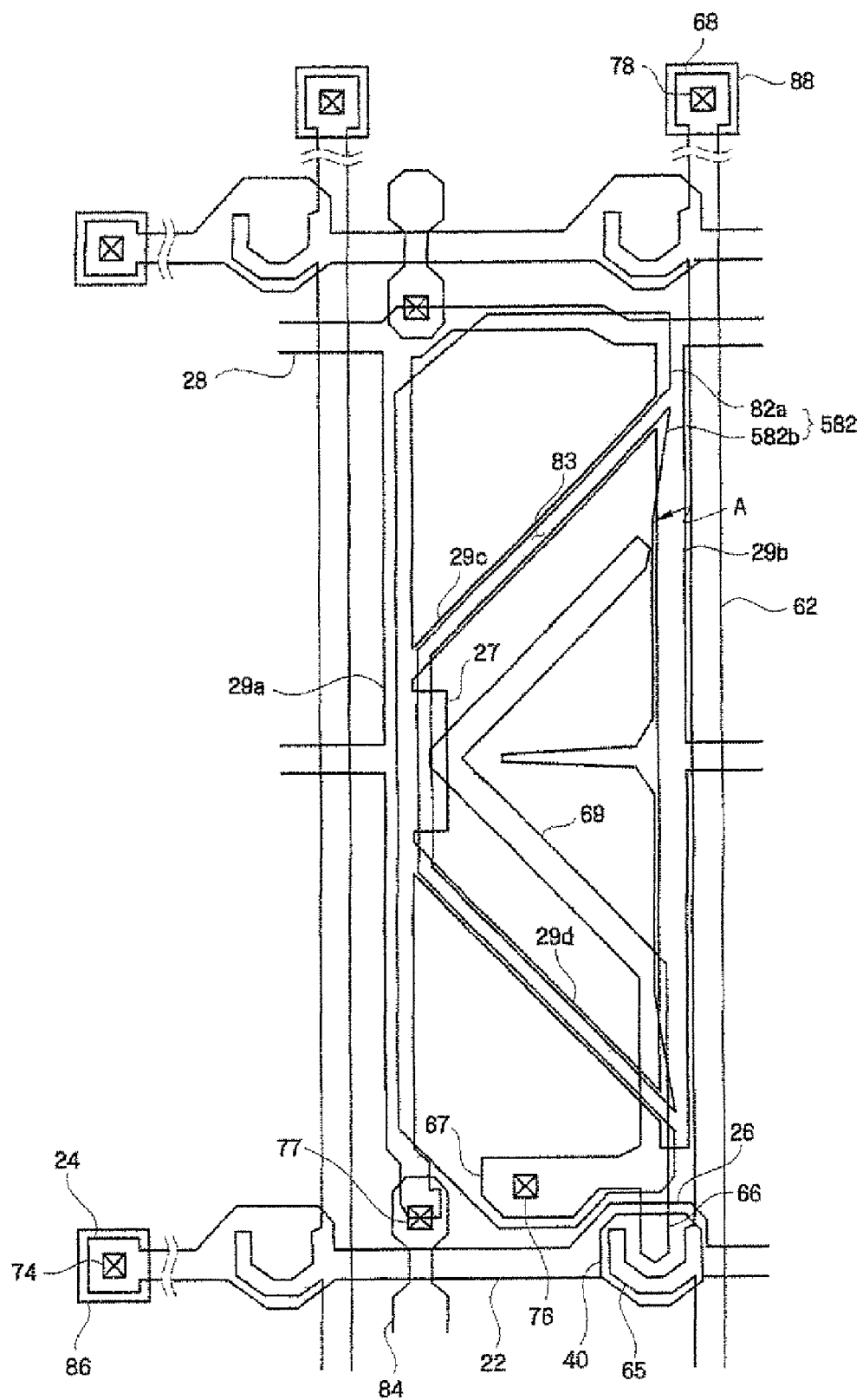
FIG. 5A is a layout of a TFT substrate of an LCD according to another exemplary embodiment of the present invention.
Figure 5B:
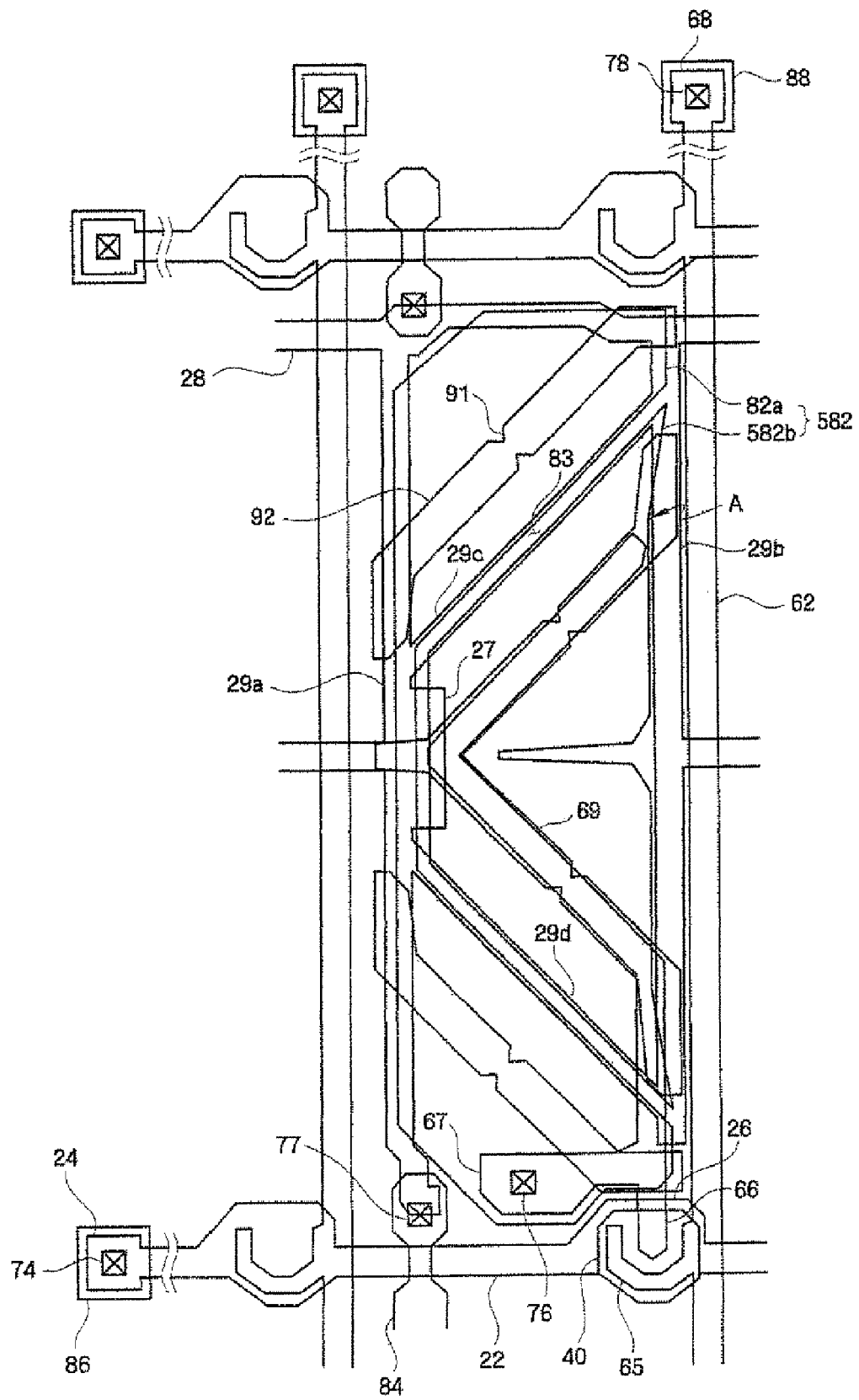
FIG. 5B is a layout of an LCD including the TFT substrate of FIG. 5A according to an exemplary embodiment of the present invention.

FIG. 5A is a layout of a TFT substrate of an LCD, and FIG. 5B is a layout of an LCD including the TFT substrate of FIG. 5A according to an exemplary embodiment of the present invention. As shown in FIG. 5A and FIG. 5B, the same components are respectively identified by the same reference numerals, and their repetitive description is omitted.

Referring to FIG. 5A and FIG. 5B, a second sub-pixel electrode 582b is modified such that an overlap area of the second sub-pixel electrode 582b and a storage electrode extension 27 is substantially the same as the overlap area of the second sub-pixel electrode 582b and a storage electrode vertical pattern 29b. A recess A is formed on the right side of the second sub-pixel electrode 582b, (i.e. on the longest lateral side of the second sub-pixel electrode 582b), so that the overlap area of the second sub-pixel electrode 582b and the storage electrode vertical pattern 29b may be substantially the same as the overlap area of the second sub-pixel electrode 582b and the storage electrode extension 27.

Therefore, even when an overlay error occurs when forming the pixel electrode 582, particularly, the second sub-pixel electrode 582b, over a storage electrode wiring 27, 28, 29a, 29b, 29c, and 29d, the overlap area of the second sub-pixel electrode 582b and the storage electrode wiring 27, 28, 29a, 29b, 29c, and 29d may be substantially uniformly maintained. Accordingly, it may be possible to substantially uniformly maintain a ratio of a voltage applied to first sub-pixel electrode 82a to a voltage applied to the second sub-pixel electrode 582b, thereby improving an LCD's display characteristics.

As described above, an LCD according to exemplary embodiments of the present invention may substantially uniformly maintain an overlap area of a pixel electrode and storage electrode wiring even when an overlay error occurs when forming the pixel electrode over the storage electrode wiring, thereby improving the LCD's display characteristics.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD), comprising:
   a gate line arranged on an insulating substrate;
   a data line insulated from the gate line and crossing with the gate line;
   a pixel electrode comprising a first sub-pixel electrode and a second sub-pixel electrode to which different voltages are applied;
   a thin film transistor electrically connected with the gate line and the data line to apply a voltage to the pixel electrode; and
   a storage electrode that overlaps with the first sub-pixel electrode and the second sub-pixel electrode,
   wherein the first sub-pixel electrode is arranged on all but one side of the second sub-pixel electrode, portions of a first side of the storage electrode overlap with the first sub-pixel electrode and the second sub-pixel electrode, portions of a second side of the storage electrode overlap with the first sub-pixel electrode, and the storage electrode comprises a storage electrode extension that protrudes from the second side of the storage electrode across the first sub-pixel electrode and overlaps with the second sub-pixel electrode.

2. The LCD of claim 1, wherein the first sub-pixel electrode and the second sub-pixel electrode are separated by a gap, and the storage electrode comprises:
   a pair of storage electrode vertical patterns that are arranged along the data line; and
   a pair of storage electrode oblique patterns that are arranged along the gap and connect the storage electrode vertical patterns.

3. The LCD of claim 2, wherein the storage electrode extension protrudes from one of the storage electrode vertical patterns, the storage electrode extension being wider than the one of the storage electrode vertical patterns.

4. The LCD of claim 2, further comprising:
   a polarizing plate arranged on the insulating substrate,
   wherein the gap comprises a first gap that forms an angle of about 45 degrees with a transmission axis of the polarizing plate and a second gap that forms an angle of about negative 45 degrees with the transmission axis of the polarizing plate.

5. The LCD of claim 1, wherein the area of portions of a first side of the second sub-pixel electrode that overlap with the storage electrode is substantially the same as the area of portions of a second side of the second sub-pixel electrode that overlap with the storage electrode.

6. The LCD of claim 5, wherein a recess is formed in a side of the second sub-pixel electrode near the data line.

7. The LCD of claim 1, wherein the second sub-pixel electrode is capacitively coupled to the first sub-pixel electrode.

* * * * *